United States Patent [19]

Robinson

[11] Patent Number: 5,687,326
[45] Date of Patent: Nov. 11, 1997

[54] METHODS AND APPARATUS FOR IMPLEMENTING A HIGH SPEED SERIAL LINK AND SERIAL DATA BUS

[75] Inventor: Jeffrey I. Robinson, New Fairfield, Conn.

[73] Assignee: I. Q. Systems, Inc., Sandy Hook, Conn.

[21] Appl. No.: 545,881

[22] Filed: Oct. 20, 1995

[51] Int. Cl.$^6$ .................................................. G06F 13/00
[52] U.S. Cl. .................... 395/285; 395/286; 395/200.14; 395/306; 375/220
[58] Field of Search ................................ 395/285, 286; 375/220, 38

[56] References Cited

U.S. PATENT DOCUMENTS

| | | | |
|---|---|---|---|
| 4,050,097 | 9/1977 | Miu et al. | 364/200 |
| 4,200,936 | 4/1980 | Borzcik et al. | 364/900 |
| 4,357,658 | 11/1982 | van der Ouderaa | 364/200 |
| 4,488,226 | 12/1984 | Wagner, Jr. et al. | 364/200 |
| 5,276,807 | 1/1994 | Kodama et al. | 395/200 |
| 5,361,376 | 11/1994 | Cummins et al. | 395/800 |
| 5,410,723 | 4/1995 | Schmidt et al. | 395/800 |

*Primary Examiner*—Ayaz R. Sheikh
*Assistant Examiner*—John Travis
*Attorney, Agent, or Firm*—David P. Gordon

[57] ABSTRACT

Methods and apparatus for implementing a high speed serial communications bus with no data loss include a point-to-point bus and a multi-user bus. Both buses are easily implemented in the system software of virtually any microprocessor and make use of virtually any one, two, or three I/O pins of the processor. The point-to-point bus allows two processors (bus users) to communicate via one, two, or three lines coupled to any two I/O pins of each processor. The multi-user bus allows an unlimited number of processors to communicate via three lines coupled to any three I/O pins of each processor. The methods of the invention include providing each processor with communications software by which data is transmitted and received one bit at a time by asserting one or more of the lines of the bus according to a fixed protocol. In the point-to-point bus, when transmitting a ZERO, the first line is a data line and the second line is an acknowledge line. When transmitting a ONE, the second line is a data line and the first line is an acknowledge line. An asserted data line is held asserted until transmission is acknowledged. In the multi-user bus, three physical lines are used, having functions D0, D1, and ACK. The functions of the physical lines are rotated according to the last bit transmitted and received. The functions don't change until all bus users acknowledge receipt of the transmitted bit.

24 Claims, 7 Drawing Sheets

FIG.8

METHODS AND APPARATUS FOR IMPLEMENTING A HIGH SPEED SERIAL LINK AND SERIAL DATA BUS

BACKGROUND OF THE INVENTION

1. Field of the Invention

The invention relates to methods and apparatus for serial transfer of binary data among digital devices. More particularly, the invention relates to a self-timed serial bus having efficient software implementation. As used herein, "serial link" means a point-to-point data link and "serial bus" means either a point-to-point or multi-user serial bus.

2. State of the Art

Known serial communications bus techniques are all based on a clock pulse data scheme. These techniques may provide clock and data signals on separate lines or provide a data signal which is encoded with clock information. Alternatively, data may be transmitted asynchronously with a clock signal being generated locally by the receiver. All techniques, however, require that the receiver view data at a specific instant in time, i.e. at the clock edge.

Many microprocessors are provided with integral (dedicated) serial data ports. However, in many applications, additional serial ports are required. The additional ports can be effected through additional external circuitry or the logic of the port can be implemented in the processor using software and any free I/O pin(s) of the processor. While the reading of serial data at specific instances is not a significant problem for dedicated devices, it poses difficult problems for software implementation in the logic of a microprocessor.

Virtually all microprocessors are required to service a number of independent tasks in an apparently concurrent manner. This is sometimes referred to as multi-tasking. In reality, a microprocessor can only operate on one task at a time and multi-tasking is accomplished by programming the microprocessor to switch between or among different tasks very rapidly so that there is an appearance of concurrent task processing. The switching among different tasks is most often in response to external events (e.g. the press of a key on a keyboard) which are random in nature. Therefore, it is problematic to program the microprocessor so that it is always available at the instance of a clock transition to read serially transmitted data. This problem is usually solved in one of two ways: through the use of polling, or through the use of interrupts.

In polling, the microprocessor repeatedly reads an I/O pin through which the clock signal is received to determine if it has changed state. Since the data must be read at an exact instance of clock signal transition, the microprocessor must poll the I/O pin at a rate which is significantly faster than the frequency of the clock signal. If the microprocessor misses a clock transition data will be lost. Serial communications clock signals are typically in the tens or hundreds of kilohertz. Therefore, the microprocessor must devote a significant number of its cycles to the task of polling the clock signal.

The use of interrupts is similar to polling but utilizes additional hardware (e.g. a separate interrupt pin, internal timers, etc.) in order to enable more efficient software. While the use of interrupts relieves the processor of some of the time wasted during polling, it still interferes with the fundamental operation of the processor, and considerable time must be spent by programmers ensuring that the scheduling of interrupts does not cause other other parts of the software to malfunction. As the rate of serial data transfer increases, the challenge in scheduling interrupts becomes progressively more difficult.

Therefore, while soft implementation of a serial port in a microprocessor is known and is widely used, the hard timing of serial data communications complicates the design of system software and places unwanted constraints on the processor.

SUMMARY OF THE INVENTION

It is therefore an object of the invention to provide methods and apparatus for implementing a self-timed serial link and serial bus.

It is also an object of the invention to provide methods and apparatus for implementing a serial link and serial bus which has an efficient software implementation.

It is another object of the invention to provide methods and apparatus for implementing a serial link and serial bus which has a robust feedback mechanism to prevent data loss.

It is also an object of the invention to provide methods and apparatus for implementing a serial link and serial bus which is suitable for high speed data transfer among digital devices.

It is another object of the invention to provide methods and apparatus for implementing a serial link and serial bus which does not require substantial hardware.

It is still another object of the invention to provide methods and apparatus for implementing a serial link and serial bus which utilizes a small number of lines and processor pins.

It is yet another object of the invention to provide methods and apparatus for implementing a serial link and serial bus which does not require interrupts.

It is also an object of the invention to provide methods and apparatus for implementing a serial link and serial bus which simplifies scheduling of microprocessor code for handling the communications port(s).

It is still another object of the invention to provide methods and apparatus for implementing a serial link and serial bus which can be implemented with the logic of a microprocessor using short code and any port pin(s).

It is also an object of the invention to provide methods and apparatus for implementing a serial link and serial bus which can be implemented with the logic of a microprocessor using code which is non-intrusive relative to system software.

In accord with these objects which will be discussed in detail below, the methods and apparatus of the present invention provide a point-to-point serial communications bus using one, two, or three lines, and a multi-user serial communications bus using three lines. All provided buses are easily implemented in the system software of virtually any microprocessor and make use of virtually any one, two or three available pins of the processor. The point-to-point bus allows two processors (bus users) to communicate via one, two, or three lines coupled to any I/O pins of each processor. In the two-line embodiment, the bus has four possible states. The transmitting processor transmits a binary ZERO by asserting line 0 (preferably by taking it low) and holding the line asserted until the receiving processor acknowledges the transmission by asserting line 1 (preferably by taking it low). When the transmitting processor sees the acknowledgment (i.e. that line 1 is low), line 0 is de-asserted. When the receiver sees that line 0 is no longer asserted, it de-asserts line 1. Similarly, a transmitting processor sends a binary ONE by asserting line 1 and holding the line asserted until the receiving processor acknowledges the transmission by asserting line 0. When the transmitting processor sees the acknowledgment, line 1 is de-asserted. When the receiver sees that line 1 is no longer asserted, it de-asserts line 0. In other words, when transmitting a ZERO, line 0 is a data line and line 1 is an acknowledge line. When transmitting a ONE, line 1 is a data line and line 0 is and acknowledge line. Therefore, every transmitted bit is accompanied by a full handshake in which the receipt of the bit is acknowledged and the acknowledgment is acknowledged, i.e. each state of the bus is held until the full handshake is completed. Moreover, if either the transmitting processor or the receiving processor needs to perform an interrupt service routine during a transfer of data, no data will be lost. Even with this frequent handshaking protocol, the simplicity of the software implementation of the bus presently allows for data transfer at rates up to approximately 200 Kbit/sec using standard 8-bit microprocessors such as the 8051, 6805, or PIC. Higher speeds are possible with high speed microprocessors. The point-to-point bus according to the invention may also be implemented using a single line where a data transmission is effected by a change in voltage and an acknowledge transmission is effected by a change in current. In either of the point-to-point bus embodiments, an additional control line may be used to signal the start of a data frame.

The multi-user bus allows an unlimited number of processors to communicate via three lines coupled to any three I/O pins of each processor. Since the multi-user bus uses three lines, the bus has eight possible states. Six states are used for data transmission. One state is used for a bus reset. One state is reserved for future use, but is recognized by software as a second reset condition. The initial state of the bus has line 0 and line 1 (data lines D0 and D1, respectively) unasserted (pulled high) and line 2 (acknowledge line ACK) asserted (pulled low) by all bus users. A transmitting processor transmits a binary ZERO by asserting line 0 (D0), i.e. by pulling line 0 low. When a receiver senses that line 0 (D0) is low, the receiver also asserts (pulls low) line 0 (D0) and releases line 2 (ACK). Since line 2 (ACK) is being pulled low by all bus users during the initial state of the bus, line 2 will not go high until all users have released line 2, i.e. when all bus users acknowledge receipt of the transmitted ZERO. When all bus users release line 2, the function of all the lines is "positively" rotated so that line 0 (now low) becomes the acknowledge (ACK) line, line 1 becomes the ZERO data line (D0), and line 2 (now high) becomes the ONE data line (D1). Further transmissions of binary ZEROS result in the same behavior of the D0, D1, and ACK lines followed by further rotation in this positive direction. Transmission of a binary ONE is effected by asserting the D1 line (whether that be physical line 0, 1, or 2), and acknowledgement from receivers is effected by asserting the D1 line and releasing the ACK line. When all receivers have released the ACK line, the function of all physical lines is rotated in the "negative" direction.

The methods of the invention include providing each processor with communications software by which data is transmitted and received one bit at a time by asserting one or more of the lines of the bus according to a fixed protocol.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
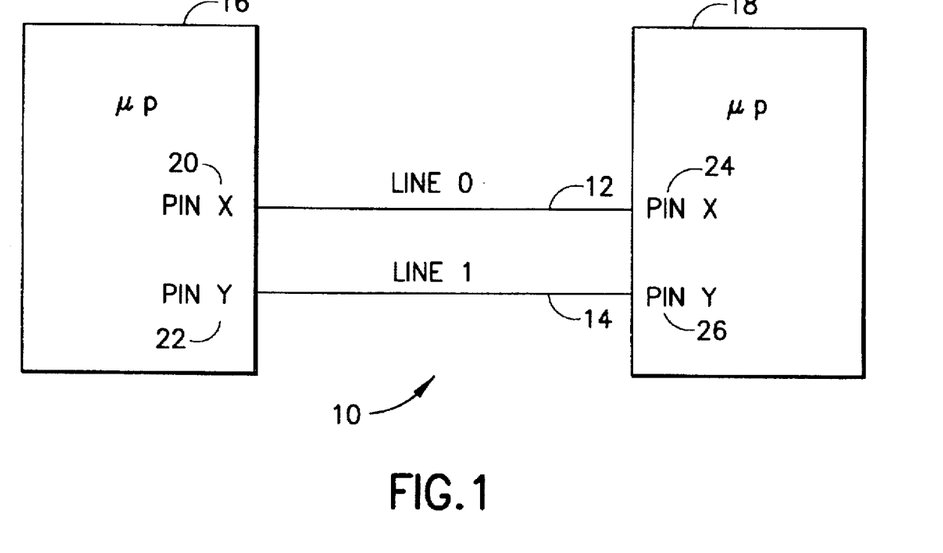
FIG. 1 is a schematic block diagram of a pair of microprocessors coupled to each other by a point-to-point two line serial bus according to the invention.
Figure 1A:
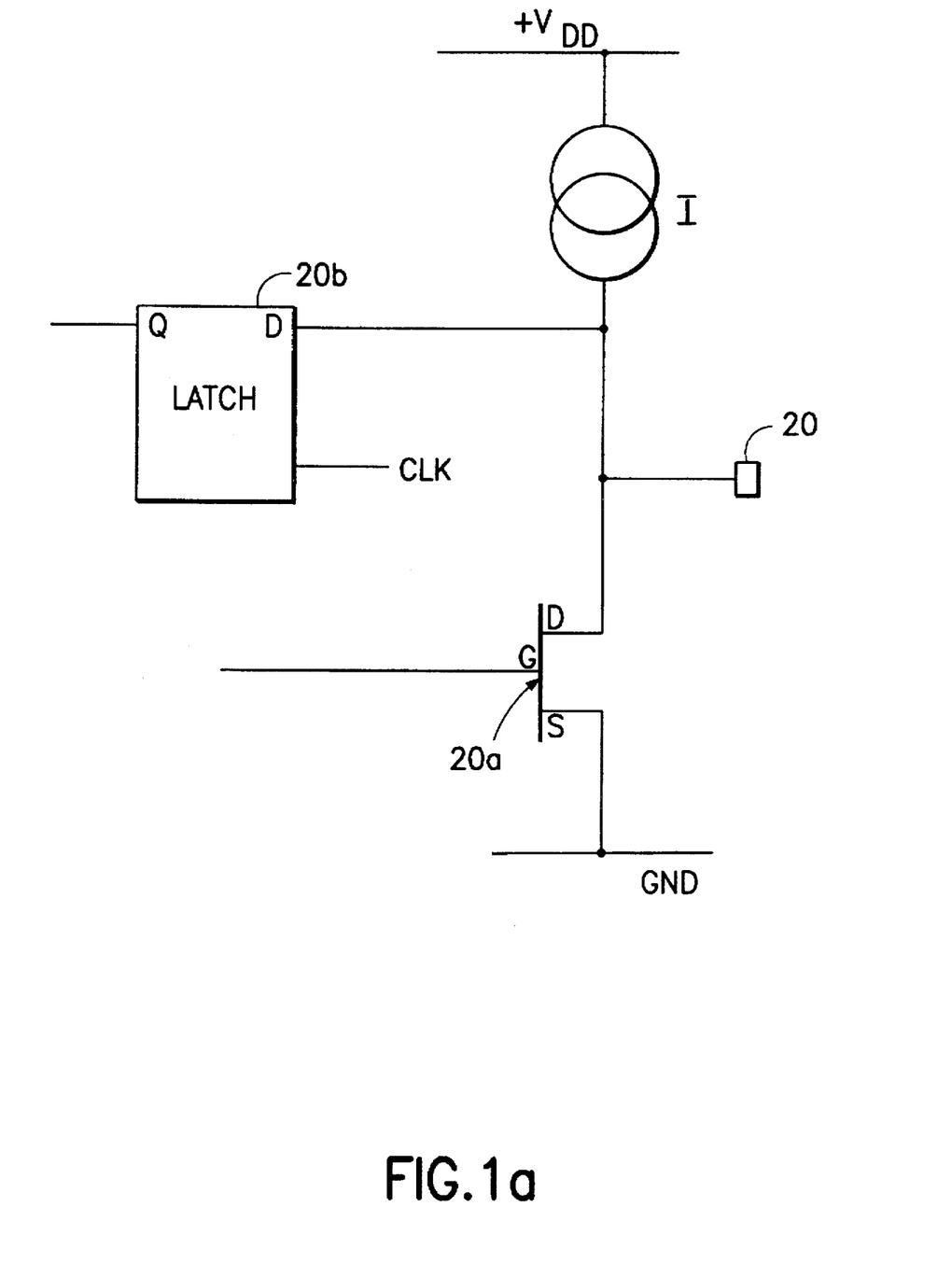
FIG. 1a is schematic block diagram of a typical port pin circuit.

Referring now to FIG. 1, a first embodiment of a point-to-point serial bus 10 according to the invention includes a first communications line 12 ("line 0") and a second communications line 14 ("line 1"). A pair of microprocessors 16, 18 are coupled to each other via the two-line serial bus 10. More specifically, the fist and second communications lines 12, 14 are coupled to respective I/O pins 20, 22 of microprocessor 16 and to respective I/O pins 24, 26 of microprocessor 18. As will be appreciated by those skilled in the art from the following description, any two I/O pins of the microprocessors 16, 18 may be used to couple the processors to the bus 10. As seen in FIG. 1a, a microprocessor I/O pin, e.g. 20, is typically coupled through a current source I to a positive voltage rail +$V_{DD}$ and through an open drain transistor 20a to ground GND. The pin 20 is also coupled to the D-input of a D-latch 20b which is clocked by the clock CLK of the microprocessor. The state (high or low) of the pin 20 is sensed and latched by the latch 20b and provided at the Q-output of the latch for use by the logic of the processor. The state of the pin 20 is pulled low when a voltage is applied to the gate G of the transistor 20a and is released and pulled high when the voltage is removed from the gate. The pin 20, therefore, functions as a bit-wide bidirectional I/O pore.

Figure 2:
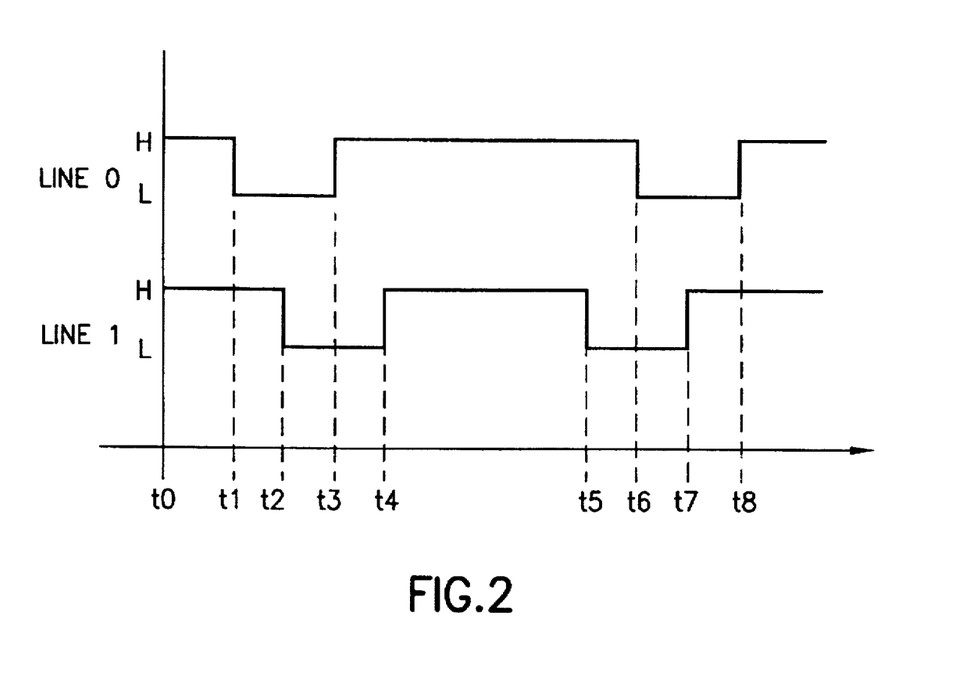
FIG. 2 is a timing diagram of the states of the point-top-point bus of FIG. 1.

Turning now to FIGS. 1 and 2, according to the methods of the invention, the initial state of the bus (e.g. at time t0) is such that both line 0 and line 1 are "unasserted". Preferably, both line 0 and line 1 are normally pulled "high" by a voltage source (not shown) when unasserted. Either processor 16, 18 transmits a ZERO bit or a ONE bit by asserting (pulling low) line 0 or line 1, respectively via an open drain transistor at the I/O pin of the processor. For example, as shown at time t1 in FIG. 2, a ZERO bit is transmitted by pulling line 0 low. In response to a bit transmission such as shown at t1, the receiving processor pulls the remaining unasserted line low. For example, in response to the asserted line 0, the receiving processor asserts line 1 at t2. This acknowledges receipt of the transmitted ZERO bit. Upon acknowledgement by the receiving processor, the transmitting processor de-asserts line 0, as shown for example at time t3 in FIG. 2. This acknowledges receipt of the acknowledgement. Upon de-assertion of line 0 by the transmitting processor, the receiving processor deasserts line 1, as shown for example at t4. The transmission of a ONE bit is effected by asserting line 1. For example, as shown at time t5 in FIG. 2, a ONE bit is transmitted by pulling line 1 low. In response to the asserted line 1, the receiving processor asserts line 0 at t6. This acknowledges receipt of the transmitted ONE bit. Upon acknowledgement by the receiving processor, the transmitting processor de-asserts line 1, as shown for example at time t7 in FIG. 2. This acknowledges receipt of the acknowledgement. Upon de-assertion of line 1 by the transmitting processor, the receiving processor deasserts line 0, as shown for example at t8. It will therefore be appreciated that the transmission of each bit of data from one microprocessor to the other is followed by a full handshake in which the receipt of the bit is acknowledged and the acknowledgement is acknowledged before the two lines are returned to their initial state. Those skilled in the art will also appreciate that when a ZERO bit is being transmitted, line 0 acts as a data line and line 1 acts as an acknowledgment line and that when a ONE bit is being transmitted, line 1 acts as a data line and line 0 acts as an acknowledgment line. It will further be appreciated that each state of the bus is maintained until acknowledged. That is, the transmitting processor maintains the assertion of the data line until it receives acknowledgment and the receiving processor maintains the assertion of the acknowledgment line until the data line is de-asserted by the transmitting processor. Therefore, if either the transmitting processor or the receiving processor needs to perform an interrupt service routine during communication, no data will be lost. In addition, software implementation of the above described protocol is simple and efficient.

An example of software (written in the C language) used to implement this method of the invention is shown in listings 1 and 2 below where the code in listing 1 implements the transmission of a byte "c", the code in listing 2 implements the reception of a byte "rxByte", and the code in listing 3 represents a portion of the processor's main task handler.

```
Code Listing 1 stateLinkTx (char c) {
    char d;
    d=8; //preset to number of bits to transmit
    while (d--) //cycle through all the bits
        if (c&0x80) }          //get the MSB of c
            //transmit a one
            DACK1=0
            while (DACK0);     //wait for ack
            DACK1=1;           //reset data line
            while (!DACK0);    //wait for reset
        } else {
            //transmit a zero
            DACK0=0
            while (DACK1);
            DACK0=1;
            while (!DACK1);
        }
        c<<=1; //rotate next bit into MSB position
    }
}
```

As seen in Code Listing 1, a byte "c" is parsed into eight bits for individual transmission via line 0 (referred to a DACK0 in the code) or line 1 (referred to as DACK1 in the code). When it is determined by the "if" statement that the bit to be transmitted is a ONE, the line DACK1 is asserted by pulling it low in the DACK1=0 statement. It is held low until the DACK0 line is seen to be pulled low in the "while (DACK0)" statement. DACK1 is then released with the statement DACK1=1. Further execution of the code awaits the return of DACK0 to the unasserted high level as shown by the statement "while (!DACK0)". When it is determined by the "else" statement that the bit to be transmitted is a ZERO, the line DACK0 is asserted by pulling it low in the DACK0=0 statement. It is held low until the DACK1 line is seen to be pulled low in the "while (DACK1)" statement. DACK0 is then released with the statement DACK0=1. Further execution of the code awaits the return of DACK1 to the unasserted high level as shown by the statement "while (!DACK1)". After a bit of the byte "c" is successfully transmitted, the next bit is obtained for transmission via the statement "cc<<=1" until eight bits have been transmitted as specified by the statement "d=8".

```
Code Listing 2 stateLinkRx (char rxByte)
{
    int i;
    for (i=0; i<8;++i){
        if (!DACK0) {
            //Receiving a zero
            rxBytes<<=1;           //shift in a zero
            DACK1=0;               //flag acknowledgement
            while (!DACK0);        //wait for TX to reset
            DACK1=1;               //reset ack line
        } else {
            //Receiving a one
            rxByte=(rxByte<<1) |1; //shift in a one
            DACK0=0;               //flag acknowledgement
            while (!DACK1);        //wait for TX to reset
            DACK0=1;               //reset ack line
        }
    }
    return (rxByte);
}
```

As seen in Code Listing 2, the receiver determines whether the transmitted bit is a ZERO or a ONE, by determining if line 0 has been taken low, that determination being made with the "if (!DACK0)" statement. If the bit is a ZERO, a zero bit is shifted into the register rxByte with the "rxByte<<=1" statement and the DACK1 line is asserted in acknowledgment with the "DACK1=0" statement. The acknowledgment is held low until the return of DACK0 to the unasserted high level as shown by the statement "while (!DACK0)". The acknowledgement is then released with the statement "DACK1=1". If the bit is a ONE, a one bit is shifted into the register rxByte with the "rxByte=(rxByte<<1)|1" statement and the DACK0 line is asserted in acknowledgment with the "DACK0=0" statement. The acknowledgment is held low until the return of DACK1 to the unasserted high level as shown by the statement "while (!DACK1)". The acknowledgement is then released with the statement "DACK0=1". The code repeats for eight bits after which the accumulated byte rxByte is returned to the receiving processor.

It will be understood that both Code Listings 1 and 2 will be implemented as callable modules within the main program of each processor. Moreover, in the case of Code Listing 2, the main task loop of the processor program will include periodic monitoring of the condition of lines 0 and 1 as shown in Code Listing 3.

Code Listing 3

```
if (!(DACK0&DACK1)) //if either line is low
    call stateLinkRx (char rxByte);
```

Those skilled in the art will appreciate that the code examples shown in listings 1–3 may be implemented in virtually any programming language and incorporated as part of system software in virtually any microprocessor. Moreover, it will further be appreciated that, in some applications, an application specific integrated circuit (ASIC) can be used rather than a microprocessor to effect the serial communications bus according to the invention. Furthermore, it will be appreciated that the above-described embodiment of the invention provides for point-to-point communication between two devices with a present data transfer rate of up to approximately 200 Kbps; and higher rates can be expected with fatser microprocessors.

Figure 3:
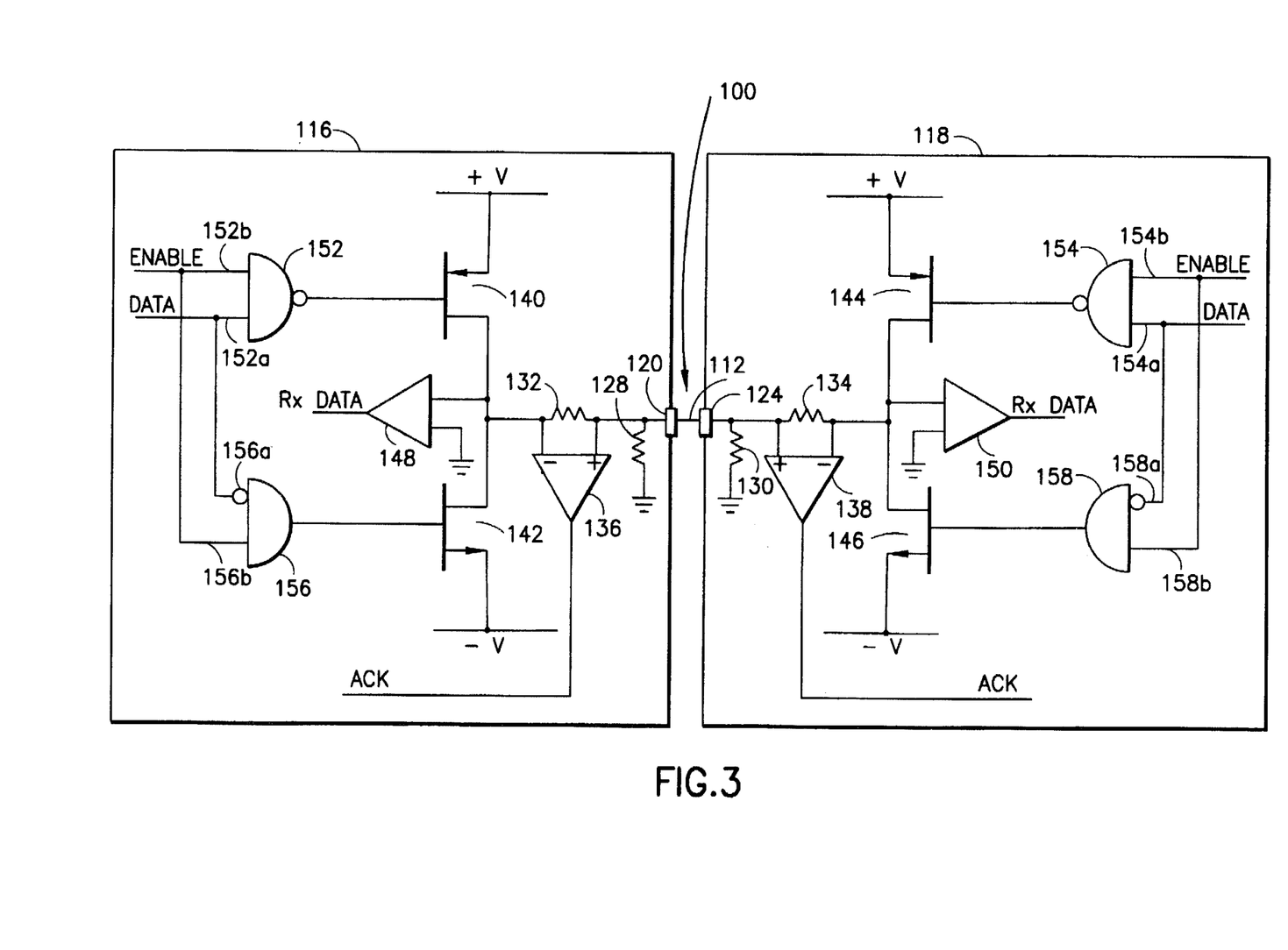
FIG. 3 is a partial schematic block diagram of a pair of digital devices coupled to each other by a point-to-point one line serial bus according to the invention.

The four state bus described above may also be implemented on a single communication line, if desired. FIG. 3 illustrates a point-to-point data link 100 which uses a single communications line 112. A pair of digital devices 116, 118 are coupled to the line 112 by respective I/O ports 120, 124. As shown in FIG. 3, the circuitry supporting the I/O port 120 of device 116 is identical to the circuitry supporting the I/O port 124 of device 118. However, as will be understood from the following, it is not necessary that the circuitry of the devices 116 and 118 be identical. The circuits shown are exemplary and it will also be understood that the devices 116, 118 will also require additional circuitry which is well known to those skilled in the art.

Turning now to FIG. 3, the I/O circuitry of each device 116 (118) includes a relatively high value resistor 128 (130) which couples the respective port 120 (124) to ground. A relatively low value resistor 132 (134) with an associated current sensing comparator 136 (138) is coupled in series between the port 120 (124) and the co-coupled drains of two switching transistors 140, 142 (144, 146). A voltage sensing (window) comparator 148 (150) has one input coupled to the co-coupled drains of the two switching transistors 140, 142 (144, 146) and another input coupled to ground. (Those skilled in the art will appreciate that a window comparatort may actually comprise two comparators and have several outputs. The comparators are shown here schematically for simplicity.) The switching transistor 140 (144) is shown as a p-channel MOSFET transistor and is coupled by its source to a positive voltage +V. The gate of transistor 140 (144) is driven by the output of a NAND gate 152 (154) which has two inputs 152a (DATA), 152b (ENABLE) (154a, 154b). The switching transistor 142 (146) is shown as an n-channel MOSFET transistor and is coupled by its source to a negative voltage −V. The gate of transistor 142 (146) is driven by the output of art AND gate 156 (158) having one inverted input 156a (158a) (DATA) and one non-inverted input 156b (158b) (ENABLE). One of the inputs 152a (154a) of the NAND gate 152 (154) is coupled to the inverted input 156a (158a) of the AND gate 156 (158) and the other input 152b (154b) of the NAND gate 152 (154) is coupled to the non-inverted input 156b (158b) of the AND gate 156 (158). According to the methods of the invention, the DATA inputs 152a, 156a (154a, 158a) of the gates 152, 156 (154, 158) are used to transmit data and acknowledgements while the ENABLE inputs 152b, 156b (154b, 158b) of the gates 152, 156 (154, 158) are used to enable transmission of data and acknowledgements. Additionally, the output of the voltage comparator 148 (150) is used to receive data while the output of the current sensing comparator 136 (138) is used to receive acknowledgments. These outputs are hereinafter referred to as RxDATA and ACK.

The I/O circuitry shown in FIG. 3 operates as follows: Initially, there is no current or voltage on the bus 112. All of the transistors are off and the DATA and ENABLE inputs are LOW. The device 116 transmits a binary ONE by asserting both the ENABLE and DATA inputs HIGH. This results in LOW outputs from both gates 152 and 156 which are applied to the gates of transistors 140, 142 respectively. Since the transistor 140 is a p-channel transistor, the LOW signal applied to its gate turns it on. Since the transistor 142 is an n-channel transistor, the LOW signal applied to its gate turns it off. This results in a signal at pin 120 having positive voltage and relatively low current. The positive voltage is carried by the line 112 to the device 118. The device 118 senses the transmission of a binary ONE when the RxDATA output of the voltage comparator 150 indicates the positive voltage. In response to the receipt of a binary ONE, the device 118 transmits an ACKNOWLEDGEMENT by asserting the ENABLE input of gates 154, 158 HIGH and the DATA input of gates 154, 158 LOW. This results in the turning on of transistor 146 which thereby couples the bus to a negative voltage (−V). This causes a relatively high current (compared to the previous state of the bus) to pass through the bus from +V to −V via transistor 140, resistors 132 and 134, and transistor 146, and this current is sensed by the comparator 136. In response, the comparator 136 provides an acknowledge indication ACK for the device 116. When the device 116 senses the ACK signal, it responds by bringing the DATA and ENABLE inputs LOW. This turns off transistor 140 and drops the current on the bus which is pulled to a negative voltage. The drop in current is sensed by the current sensor 138 which indicates to the device 118 that the ACK is no longer present. The device 118 responds by bringing the ENABLE input low, thereby turning off transistor 146 and returning the bus 112 to its initial state.

Those skilled in the art will appreciate that the transmission of a binary ZERO by the device 116 is effected by asserting the ENABLE input of gates 152, 156 HIGH and the DATA input of gates 152, 156 LOW. This turns on transistor 142 which provides a negative voltage low current signal on the bus. The device 118 senses the voltage at comparator 150 and transmits an ACK by bringing the DATA and ENABLE inputs of gates 154, 158 HIGH. This turns on transistor 144 which couples a positive voltage to the bus and thus raises the current flowing through the bus. The current is sensed by comparator 136 which provides the ACK signal to device 116. In response to the ACK signal, the device 116 brings the ENABLE input LOW, turning off transistor 142 and dropping the current on the bus. The absence of current is detected by comparator 138 and the device 118 responds by bringing the DATA and ENABLE inputs LOW. The bus then returns to its idle state. It will be appreciated that the bus described in FIG. 3 has four states: positive voltage with low current, negative voltage with low current, no voltage or floating voltage with no current, and a high current state.

Figure 4:
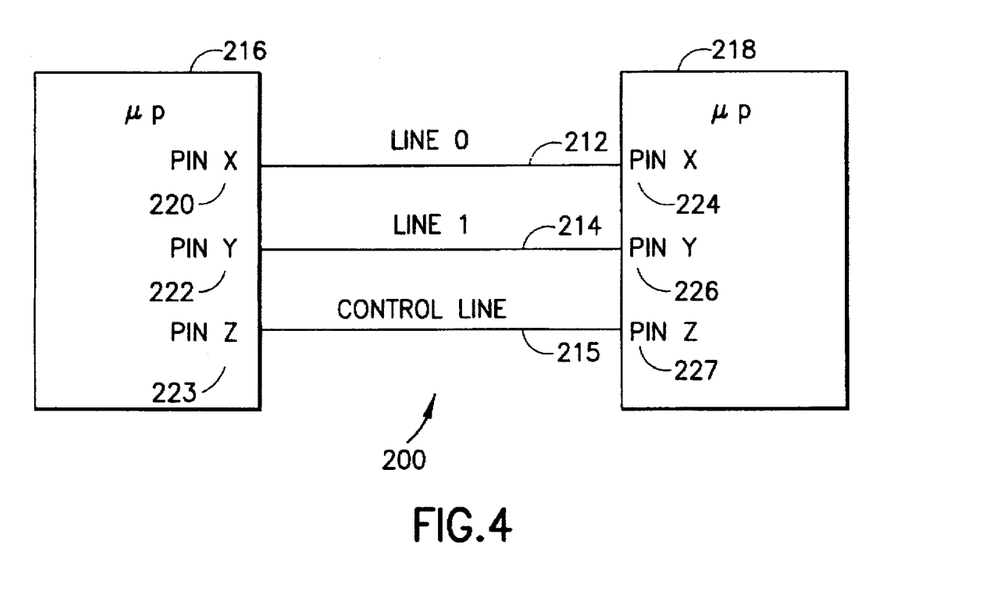
FIG. 4 is a schematic block diagram of a pair of microprocessors coupled to each other by a point-to-point three line serial bus according to the invention.
Figure 5:
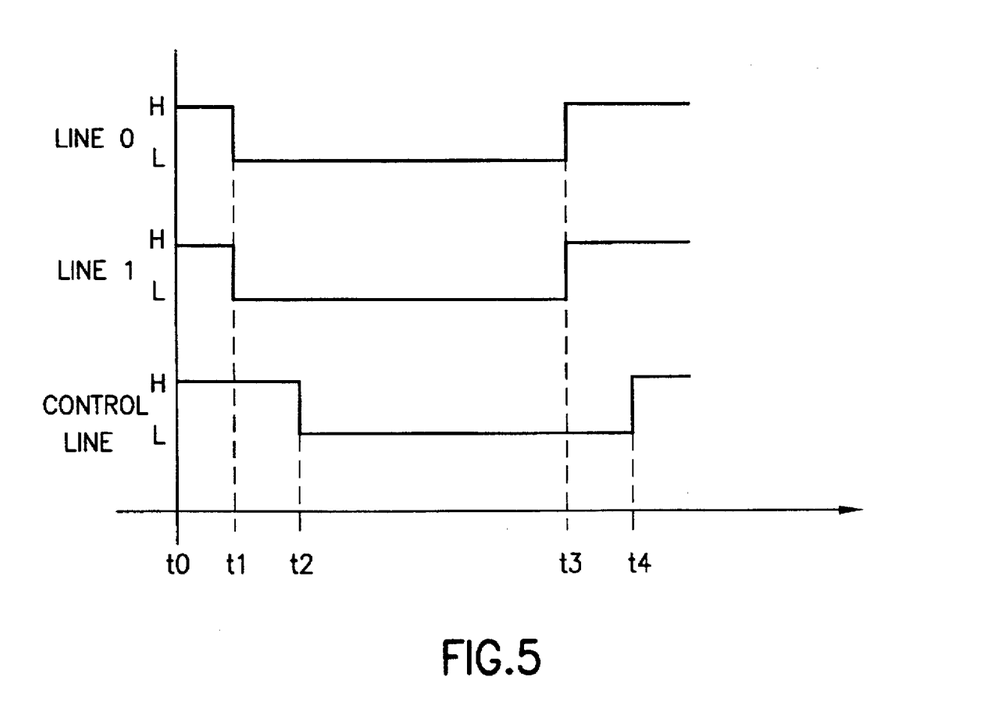
FIG. 5 is a timing diagram of a frame start sequence using the point-to-point bus of FIG. 4.

Both of the above-described point-to-point data transfer methods provide for a bit-by-bit acknowledgement and maintain the state of the bus until each bit is acknowledged. Thus, the data transfer is self-timed and there is no need for interrupts to prevent loss of data. The software implementation of the serial link is simple and robust. However, in addition to the protocols described above, it is useful in serial data transmission to "frame" the data stream. Framing is typically accomplished by flagging the start and stop of a group of bits. Using the protocols described above, it is possible to flag the start and stop of a frame with an otherwise illegal state transition. For example, in the two wire bus described above, a transition from LOW LOW to HIGH HIGH or from HIGH HIGH to LOW LOW could be used, but the bus would have to be kept in this state for an undetermined length of time so that the receiver is guaranteed to recognize it. Although this method of framing is relatively simple to implement, it can significantly reduce the data transmission rate as frame starts are frequently occurring events. An alternative approach is to provide an additional line on the bus for use in indicating the start of a frame. FIGS. 4 and 5 illustrate how the two wire bus system of FIGS. 1 and 2 may be modified to accomplish efficient framing of data.

Turning now to FIGS. 4 and 5, a point-to-point serial bus 200 according to the invention includes a first communications line 212 ("line 0"), a second communications line 214 ("line 1"), and a third communications line 215 (the "control line"). A pair of microprocessors 216, 218 are coupled to each other via the three-line serial bus 200. More specifically, the first, second, and third communications lines 212, 214, and 215 are coupled to respective I/O pins 220, 222, 223 of microprocessor 216 and to respective I/O pins 224, 226, 227 of microprocessor 218. As will be appreciated by those skilled in the art, any three I/O pins of the microprocessors 216, 218 may be used to couple the processors to the bus 200. The bus 200 operates in substantially the same manner as the bus 10 described above. However, as illustrated in FIG. 5, the start of a frame is signalled by taking line 0 and line 1 from the HIGH HIGH idle state of t0 to the state LOW LOW at time t1. Both lines are held in this state until the receiver takes the control line LOW at t2. The receiver holds the control line LOW until the transmitter releases line 0 and line 1 at t3. When the receiver sees that lines 0 and 1 are no longer pulled LOW, it releases the control line at t4, after which the transmitter may begin data transmission as described above with reference to FIGS. 1 and 2. It will be appreciated that this protocol for flagging the start of a frame is self-timing like the protocol for transmitting data described above. Therefore, communication is never unduly delayed and may proceed at a rate as fast as the processors will allow. According to the presently preferred embodiment of the invention, a frame is eight bits (one byte), and the end of the frame is known by the receiver when eight bits are received. During the transmission of the frame, the control line is preferably left HIGH. If the receiver detects an error or the transmitter decides to abort the transmission, either can pull the control line low for a defined time (e.g. one millisecond) to signal a reset and resend.

Figure 6:
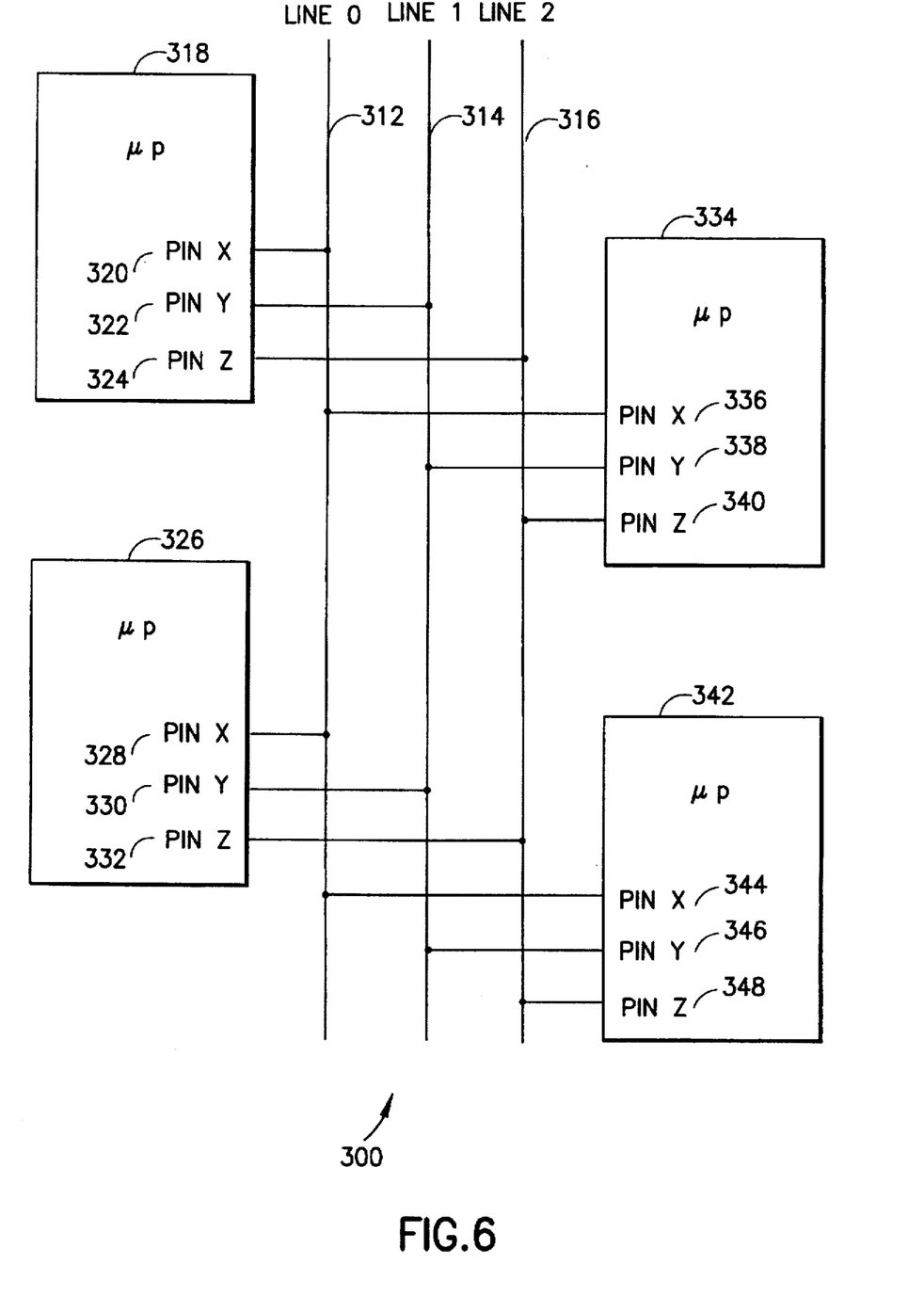
FIG. 6 is a schematic block diagram of four microprocessors coupled to a multi-user serial bus according to the invention.

Turning now to FIG. 6, a multi-user bus 300 according to the invention utilizes three lines 312, 314, 316 ("line 0", "line 1", and "line 2") each of which is coupled to a respective I/O pin of a microprocessor. For example, microprocessor 318 is coupled to the bus 300 via I/O pins 320, 322, 324 which are coupled to lines 312, 314, 316, respectively. Microprocessor 326 is coupled to the bus 300 via I/O pins 328, 330, 332 which are coupled to lines 312, 314, 316, respectively. Microprocessor 334 is coupled to the bus 300 via I/O pins 336, 338, 340 which are coupled to lines 312, 314, 316, respectively. Microprocessor 342 is coupled to the bus 300 via I/O pins 344, 346, 348 which are coupled to lines 312, 314, 316, respectively. According to the methods of the invention, the physical lines 312, 314, and 316 each function as a ZERO data line, a ONE data line, and an ACKnowledge line. Which function each physical line performs depends, as described in detail below, on the state of the bus 300.

Figure 7:
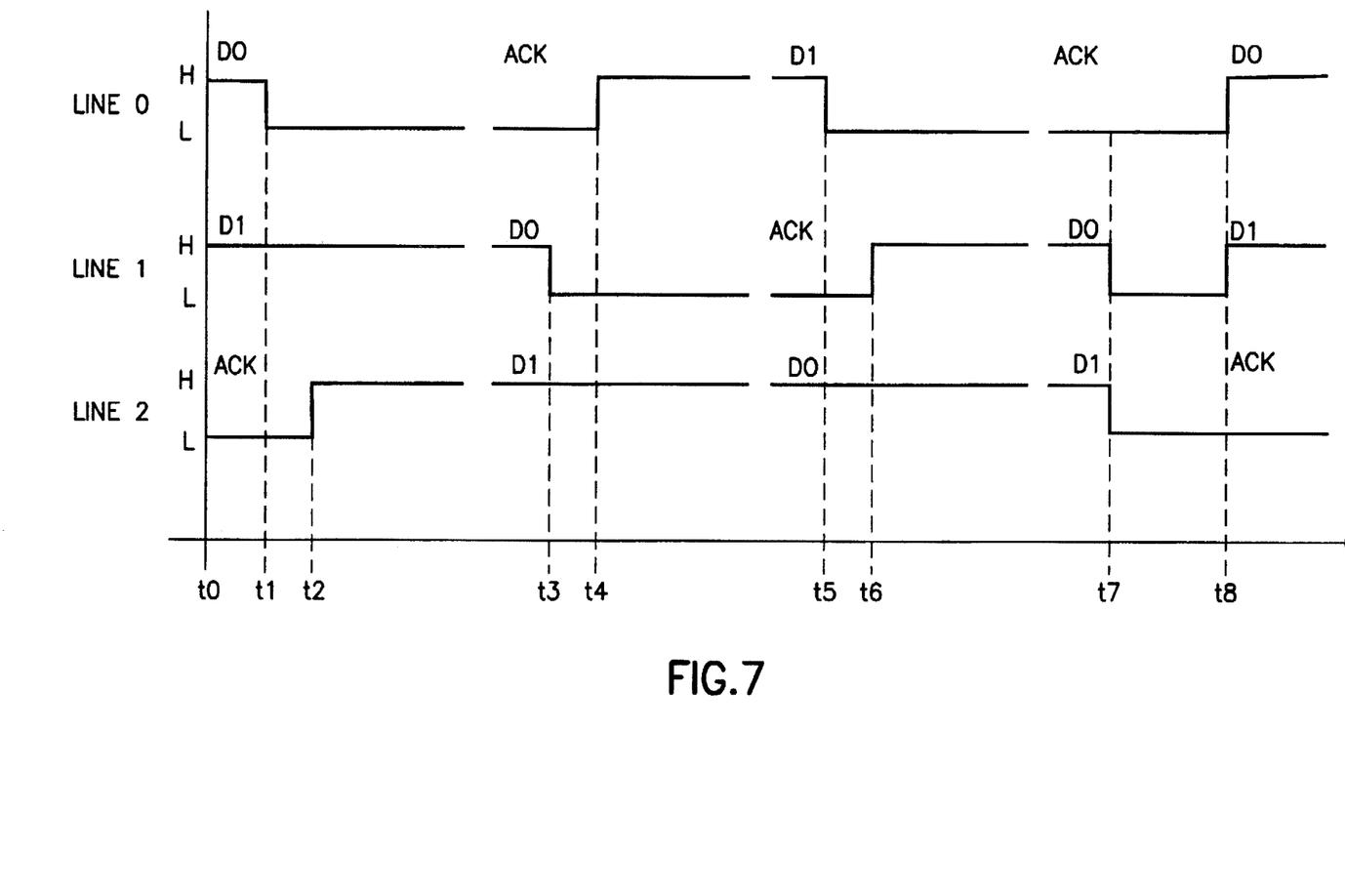
FIG. 7 is a timing diagram of the states of the multi-user bus of FIG. 6.

The multi-user bus methods according to the invention will be better understood with reference to FIG. 7. The initial state of the bus is illustrated at time t0 in FIG. 7 where line 0 functions as the ZERO data line (D0), line 1 functions as the ONE data line (D1), and line 2 functions as the acknowledge line (ACK). In this initial state, the data lines D0 and D1 are pulled high (unasserted) and the acknowledge line ACK is pulled low by all the bus users.

The transmission of a ZERO bit by a bus user is effected by asserting the D0 line and the transmission of a ONE bit is effected by asserting the D1 line in the initial state of the bus, therefore, the transmission of a ZERO bit by a transmitting bus user is effected by asserting line 0 as shown at time t1 in FIG. 7. In response to the transmission of a ZERO bit, all receiving bus users also assert the D0 line and also release the ACK line. It will be understood, however, that since the ACK line is initially pulled low by all of the bus users, it will not go high until all receiving bus users have released the ACK line. The transmitting bus user releases the ACK line at the start of transmission. When acknowledgement has been noted by all of the bus users, the ACK line goes high as shown at time t2 in FIG. 7. Upon the ACK line going high, the function of each of the physical lines line 0, line 1, and line 2 rotates so that the lines which are now high (line 2 and line 3) become the data lines (D0 and D1 respectively) and the line which is now low (line 0) becomes the acknowledgement line (ACK). This state of the bus is shown in FIG. 7 during the time between t2 and t3. A next ZERO bit transmission, will therefore be effected by asserting line 1, as shown in FIG. 7 at time t3, since line 1 now functions as the D0 line. Acknowledgement by all bus users will result in line 0 going high, as shown in FIG. 7 at time t4, since line 0 now functions as the ACK line. Following the acknowledgement at time t4, the function of each of the physical lines line 0, line 1, and line 2 rotates so that the lines which are now high (line 2 and line 0) become the data lines (D0 and D1 respectively) and the line which is now low (line 1) becomes the acknowledgement line (ACK). This state of the bus is shown in FIG. 7 during the time between t4 and t5. As described thus far, following each ZERO bit transmission and acknowledgement, the function of each physical line is rotated clockwise or in a positive direction. For example, following the acknowledgment at t2 in FIG. 7, the function D0 is rotated from line 0 to line 1, the function D1 is rotated from line 1 to line 2, etc.

As mentioned above, the transmission of a ONE bit is effected by asserting the D1 line, which, as described above, may be any of the physical lines depending on the state of the bus. For example, from the bus state shown between times t4 and t5, a ONE bit is transmitted by asserting physical line 0 (which in this state has the function D1) as shown in FIG. 7 at time t5. The transmission of a ONE bit is followed by each of the receiving bus users asserting the D1 line and releasing the ACK line. When all bus users have released the ACK line, as shown in FIG. 7 at time t6, the function of the physical lines is rotated so that the lines which are now high (line 1 and line 2) become the data lines (D0 and D1 respectively) and the line which is now low (line 0) becomes the acknowledgement line (ACK). It will be appreciated that the rotation of physical line functions following the acknowledgement of a ONE bit transmission is counterclockwise or negative. For example, in the function rotation following the acknowledgement at t6 in FIG. 7, the function D0 is rotated from line 1 to line 0, the function D1 is rotated from line 2 to line 1, etc..

During the times, between data transmission and full acknowledgment, e.g. between times t1 and t2, between times t3 and t4, and between times t5 and t6, the bus may be said to be "meta-stable". According to the presently preferred embodiment of the invention, bus users are prevented from transmitting during these meta-stable bus states. It will be understood that the meta-stable states are indicated when any two lines are low and one line is high.

It will be appreciated that each bus user in the multi-user embodiment of the invention must track the state of the bus so that each bus user knows which physical line has which function. Also, it will be appreciated that under some circumstances it will be necessary to reset the bus to its initial state where line 0 is the D0 line, line 1 is the D1 line, and where line 2 is the ACK line. According to a preferred embodiment of the invention, the bus is reset by taking all three lines low as shown at time t7 in FIG. 7. While it is possible that any bus user could be permitted to reset the bus, it is more typical that the decision to reset the bus will be the province of a master bus user. When the bus users sense that all lines have been taken low, the functionality of the physical lines is restored to the initial state as shown at time t8 in FIG. 7.

Figure 8:
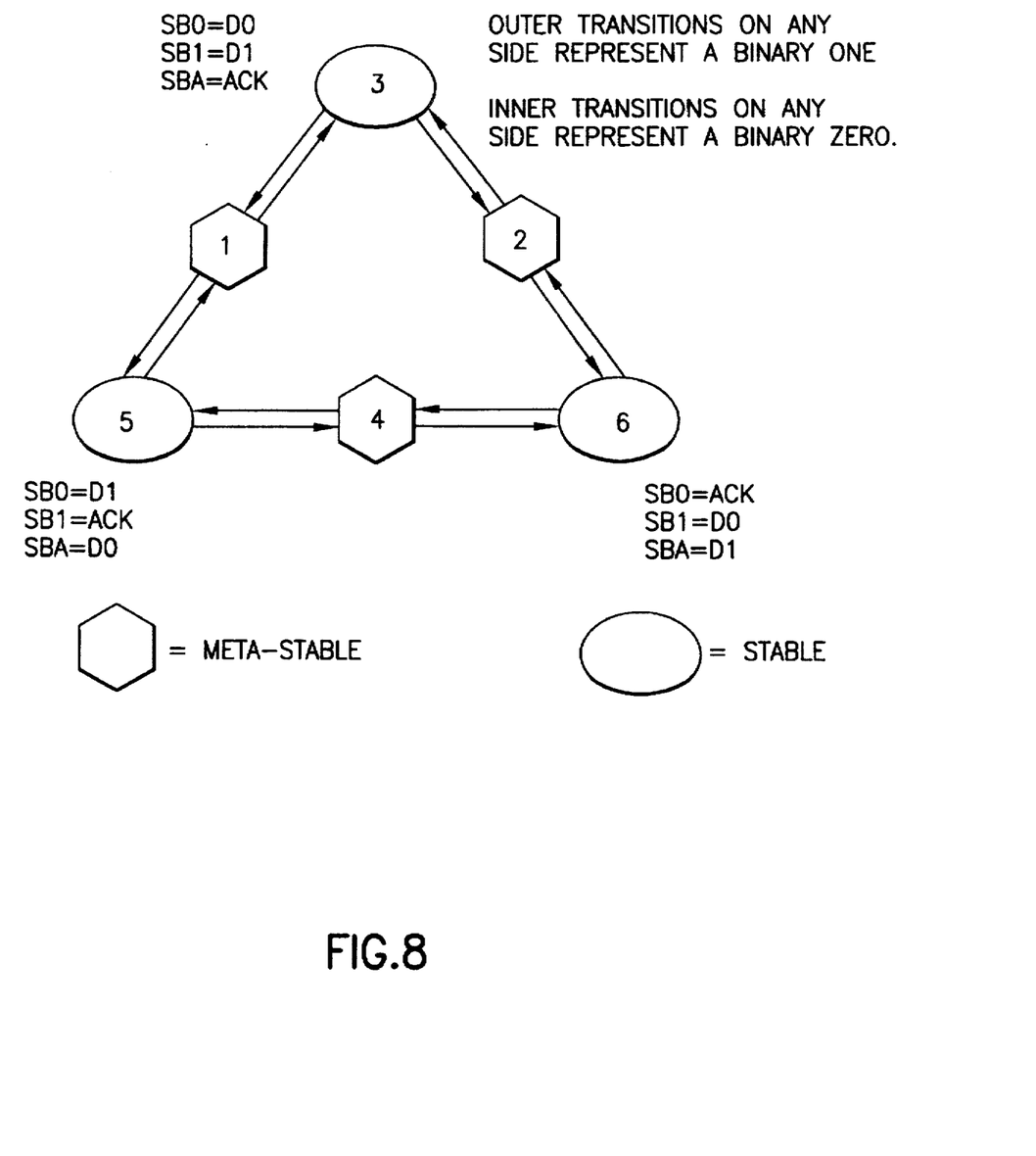
FIG. 8 is a state diagram of stable and meta-stable states of the multi-user bus of FIG. 6.

Exemplary code for implementing the multi-user bus according to the invention are shown in Code Listings 4 and 5. In order to better understand the code in listings 4 and 5, however, it is useful to consider the state diagram in FIG. 8. For the purpose of illustrating the code listings, the designations SB0, SB1, and SBA are used in FIG. 8 and in the code listings to indicate the physical lines of the bus where SB0 is line 0, SB1 is line 1, and SBA is line 2. FIG. 8 shows the three stable states of the bus in numbered ovals 3, 5, and 6 and the meta-stable states of the bus in numbered hexagons 1, 2, and 4. The outer arrows in FIG. 8 illustrate bus state transitions upon the transmission and acknowledgement of a ONE bit and the inner arrows show the transitions following the transmission and acknowledgement of a ZERO bit.

Turning now to FIG. 8, the initial state of the bus is shown at the oval numbered 3 where the SB0 line has the D0 function, the SB1 line has the D1 function and the SBA line has the ACK function. Upon transmitting a binary ONE, the bus enters a meta-stable state shown at the hexagon numbered 1. Upon acknowledgement of the transmitted ONE by all bus users, the bus enters the stable state shown at the oval numbered 5 wherein the SB0 line has the D1 function, the SB1 line has the ACK function and the SBA line has the D0 function. From the state 5, the transmission of a binary ONE causes the bus to a meta-stable state shown at the hexagon numbered 4. Upon acknowledgement of the transmitted ONE by all bus users, the bus enters the stable state shown at the oval numbered 6 wherein the SB0 line has the ACK function, the SB1 line has the D0 function and the SBA line has the D1 function. Further transmissions of binary ONE change the state of the bus in the counterclockwise direction through the states shown in FIG. 8. From the initial state of the bus at the oval numbered 3, the transmission of a binary ZERO places the bus in a meta-stable state shown at the hexagon numbered 2. Upon acknowledgement of the transmitted ZERO by all bus users, the bus enters the stable state shown at the oval numbered 6 wherein the SB0 line has the ACK function, the SB1 line has the D0 function and the SBA line has the D1 function. Further transmissions of binary ZERO change the state of the bus in the clockwise direction through the states shown in FIG. 8.

Code Listing 4 is illustrative of software used to transmit data on the bus and Code Listing 5 is illustrative of software used to receive data from the bus. Referring now to Code Listing 4, each bit of a byte "c" is transmitted Sequentially with the MSB first. The transmitting bus user checks the stable state of the bus by reading each line and asserts the appropriate line SB0, SB1, or SBA depending on the bus state. The state of the bus is indicated in the code listing as "case 3", "case 5", and "case 6" which refer to the states 3, 5, and 6 shown in FIG. 8 discussed above.

Code Listing 4

```
stateBusTX (char c) {
    char d;
    d=8;  //preset to number of bits to transmit
    while (d--){ //cycle through all bits
        sbCurrentState = sbPort & 0x3;   //read the SB0 and
                                          SB1 pins
        if (c && 0x80) {                  //get MSB of c
            //transmit a one
            //Determine stable state from previous read
            switch (sbCurrentState){
                case 3:                   //default state
                    SB1=0;
                    while (!SBA);         //wait for ack
                    break;
                case 5:                   //SB0=D1, SB1=ACK,
                                           SBA=D0
                    SB0=0;
                    while (!SB1);         //wait for ack
                    break;
                case 6:                   //SB0=ACK, SB1=D0,
                                           SBA=D1
                    SBA=0;
                    while (!SB0);         //wait for ack
                    break;
            }
        } else {
            //transmit a zero
            switch (sbCurrentState) {
                case 3:
                    SB0=0;
                    while (!SBA);         //wait for ack
                    break;
                case 5:
                    SBA=0;
                    while (!SB1);         //wait for ack
                    break;
                case 6:
                    SB1=0;
                    while (!SB0);         //wait for ack
                    break;
            }
        }
        c<<=1;  //rotate next bit to MSB position
    }
}
```

Code Listing 5

```
stateBusRx () {
    sbCurrentState = sbPort & 0x3         //get the port pins
    switch (sbPrevState){
        case 0:
            //reset from bus master or host;
            SB0=SB1=1;
            SBA=0;
            break;
        case 3:
            switch (sbCurrentState) {
                case 1:
                    //TX flagging a one-respond by releasing
                    //ack and holding SB1 line low, clk one
                    //into the rxByte
                    rxByte=(rxByte<<1)|1;
                    SBA=1; SB1=0;
                    while (!SBA);         //wait for ack
                    break;
```

```
Code Listing 5 case 2:
        //TX flagging a zero-respond by releasing
        //ack and holding SBO line low, clk zero
        //into the rxByte
        rxByte<<=1;
        SBA=1; SB0=0;
        while (!SBA);              //wait for ack
        break;
    case 3:
        break;                     //nothing happened
    default:
        //Error condition
        call errorHandler();
    }
    break;
case 5:
    switch (sbCurrentState) {
        case 1:
            //TX flagging a zero
            rxByte<<=1;
            SBA=0; SB1=1;
            while (!SB1);          //wait for ack
            break;
        case 4:
            //TX flagging a one
            rxByte=(rxByte<<1)|1;
            SB0=0; SB1=1;
            while (!SB1);          //wait for ack
            break;
        default:
            //Error condition
            call errorHandler ();
    }
    break;
case 6:
    switch (sbCurrentState) {
        case 4:
            //TX flagging a zero
            rxByte<<=1;
            SB1=0; SB0=1;
            while (!SB0);          //wait for ack
            break;
        case 2:
            //TX flagging a one
            rxByte= (rxByte<<1)|1;
            SBA=0; SB0=1;
            while (!SB0);          //wait for ack
            break;
        default:
            //Error condition
            call errorHandler();
    }
    break;
    }
  }
}
```

Referring now to Code Listing 5, the receiving bus users accumulate bits to receive "rxByte" and identify the stable and meta-stable states of the bus by reading the lines. The meta-stable states of the bus are indicated in Code Listing 5 as "case 1", "case 2", and "case 4" which correspond to the meta-stable states 1, 2, and 4 shown in FIG. 8 and discussed above. Depending on the state of the bus, the receivers assert and release the appropriate lines in accord with the methods descirbed above. It should be noted that in each meta-stable state, each receiver waits for all of the receivers to release the ACK line before incrementing to the next stable state. This is shown in the code with the "while (!SBx)" statement.

There have been described and illustrated herein several embodiments of a self-timed high speed serial data bus which is easily implemented in software. While particular embodiments of the invention have been described, it is not intended that the invention be limited thereto, as it is intended that the invention be as broad in scope as the art will allow and that the specification be read likewise. Thus, while particular code listings have been disclosed, it will be appreciated that other code could be utilized to effect the methods of the invention. Also, while the methods of the invention have been shown as a static communication protocol, it will be recognized that additional time-out code could be incorporated into the invention. Moreover, while the invention has been disclosed as having microprocessors coupled to the data bus, it will be understood that other programmable devices can utilize the methods and apparatus of the invention. It will also be understood that circuitry other than the circuits shown may be used to assert and detect signals according to the methods described herein. Moreover, features of the disclosed embodiments may be mixed to provide other embodiments. For example, the single-line voltage-current embodiment may be combined with a control line or a separate ACK line to serve multiple users and/or to provide rapid framing signals. Also, the three-line multiple user embodiment may be reset after each acknowledgement so that the functions of the physical lines remains the same throughout data transmission. Furthermore, which assertion of certain signals has been disclosed a high or low or positive or negative, it will be understood that low may be substituted for high and negative may be substituted for positive and vice versa while obtaining substantially the same results. It will therefore be appreciated by those skilled in the art that yet other modifications could be made to the provided invention without deviating from its spirit and scope as so claimed.

I claim:

1. A serial data communications bus system comprising:
   a) a first bus user having first means for transmitting a binary ZERO and first means for transmitting a binary ONE;
   b) a second bus user having second means for transmitting a binary ZERO and second means for transmitting a binary ONE;
   c) a communications bus coupled to said first bus user and said second bus user, wherein
      said first bus user transmits a ZERO bit to said second bus user by activating said first means for transmitting a binary ZERO,
      said second bus user acknowledges receipt of said ZERO bit by activating said second means for transmitting a binary ONE,
      said first bus user transmits a ONE bit to said second bus user by activating said first means for transmitting a binary ONE, and
      said second bus user acknowledges receipt of said ONE bit by activating said second means for transmitting a binary ZERO.

2. A serial data communications bus system according to claim 1, wherein:
   said communications bus includes a ZERO data line and a ONE data line,
   said first means for transmitting a binary ZERO includes means for asserting said ZERO data line,
   said first means for transmitting a binary ONE includes means for asserting said ONE data line,
   said second means for transmitting a binary ZERO includes means for asserting said ZERO data line,
   said second means for transmitting a binary ONE includes means for asserting said ONE data line,
   said first bus user transmits a ZERO bit to said second bus user by asserting said ZERO data line,
   said second bus user acknowledges receipt of said ZERO bit by asserting said ONE data line, said first bus user transmits a ONE bit to said second bus user by asserting said ONE data line, and said second bus user acknowledges receipt of said ONE bit by asserting said ZERO data line.

3. A bus system according to claim 2, wherein:

said first bus user transmits a ZERO bit to said second bus user by asserting said ZERO data line and keeping said ZERO data line asserted until receipt of said ZERO bit is acknowledged by said second bus user, and said first bus user transmits a ONE bit to said second bus user by asserting said ONE data line and keeping said ONE data line asserted until receipt of said ONE bit is acknowledged by said second bus user.

4. A bus system according to claim 3, wherein:

said second bus user acknowledges receipt of said ZERO bit by asserting said ONE data line and keeping said ONE data line asserted until said first bus user de-asserts said ZERO data line, and said second bus user acknowledges receipt of said ONE bit by asserting said ZERO data line and keeping said ZERO data line asserted until said first bus user de-asserts said ONE data line.

5. A bus system according to claim 2, wherein:

said first bus user is a first microprocessor, said first microprocessor is coupled to said ZERO data line via a first I/O pin of said first microprocessor, and said first microprocessor is coupled to said ONE data line via a second I/O pin of said first microprocessor.

6. A bus system according to claim 5, wherein:

said second bus user is a second microprocessor, said second microprocessor is coupled to said ZERO data line via a first I/O pin of said second microprocessor, and said second microprocessor is coupled to said ONE data line via a second I/O pin of said second microprocessor.

7. A bus system according to claim 2, wherein:

said communications bus also includes a control line, said first bus user and said second bus user are coupled to said control line, said first bus user transmits a framing signal to said second bus user by asserting both said ZERO data line and said ONE data line, and said second bus user acknowledges receipt of said framing signal by asserting said control line.

8. A bus system according to claim 1, wherein:

said first means for transmitting a binary ZERO includes means for coupling a negative voltage to said communications bus, said first means for transmitting a binary ONE includes means for coupling a positive voltage to said communications bus, said second means for transmitting a binary ZERO includes means for coupling a negative voltage to said communications bus, said second means for transmitting a binary ONE includes means for coupling a positive voltage to said communications bus, said first bus user transmits a ZERO bit to said second bus user by coupling a negative voltage to said communications bus, said second bus user acknowledges receipt of said ZERO bit by coupling a positive voltage to said communications bus, said first bus user transmits a ONE bit to said second bus user by coupling a positive voltage to said communications bus, and said second bus user acknowledges receipt of said ONE bit by coupling a negative voltage to said communications bus.

9. A bus system according to claim 8, wherein:

said first bus user transmits a ZERO bit to said second bus user by coupling a negative voltage to said communications bus and keeping said negative voltage coupled to said communications bus until receipt of said ZERO bit is acknowledged by said second bus user, and said first bus user transmits a ONE bit to said second bus user by coupling a positive voltage to said communications bus and keeping said positive voltage coupled to said communications bus until receipt of said ONE bit is acknowledged by said second bus user.

10. A bus system according to claim 9, wherein:

said second bus user acknowledges receipt of said ZERO bit by coupling a positive voltage to said communications bus and keeping said positive voltage coupled to said communications bus until said first bus user uncouples said negative voltage from said communications bus, and said second bus user acknowledges receipt of said ONE bit by coupling a negative voltage to said communications bus and keeping said negative voltage coupled to said communications bus until said first bus user uncouples said positive voltage from said communications bus.

11. A bus system according to claim 10, wherein:

said first bus user includes first means for receiving a transmitted bit and first means for receiving an acknowledgement of receipt of a bit, and said second bus user includes second means for receiving a transmitted bit and second means for receiving an acknowledgement of receipt of a bit.

12. A bus system according to claim 11, wherein:

said first means for receiving a transmitted bit and said second means for receiving a transmitted bit each include one of voltage sensing means and current sensing means.

13. A bus system according to claim 12, wherein:

said first means for receiving an acknowledgement of receipt of a bit and said second means for receiving an acknowledgement of receipt of a bit each include an other of voltage sensing means and current sensing means.

14. A serial data communications bus system according to claim 1, wherein:

said communications bus includes a ZERO data line and a ONE data line, said first means for transmitting a binary ZERO includes means for asserting said ZERO data line, said first means for transmitting a binary ONE includes means for asserting said ONE data line, said second means for transmitting a binary ZERO includes means for asserting said ZERO data line, said second means for transmitting a binary ONE includes means for asserting said ONE data line, said communications bus includes an acknowledge line, said first bus user includes means for asserting said acknowledge line, said second bus user includes means for asserting said acknowledge line, said acknowledge line is normally asserted by said first and second bus users, said first bus user transmits a ZERO bit to said second bus user by asserting said ZERO data line, said second bus user acknowledges receipt of said ZERO bit by asserting said ZERO data line and de-asserting said acknowledge line, said first bus user transmits a ONE bit to said second bus user by asserting said ONE data line, and said second bus user acknowledges receipt of said ONE bit by asserting said ONE data line and de-asserting said acknowledge line.

15. A bus system according to claim 14, wherein: in an initial state, said ZERO data line is carried on a first physical line, said ONE data line is carried on a second physical line, said acknowledge line is carried on a third physical line, if said second bus user acknowledges receipt of said ZERO bit, in a next state, said ZERO data line is carried on said second physical line, said ONE data line is carried on said third physical line, and said acknowledge line is carried on said first physical line.

16. A bus system according to claim 15, wherein: after said initial state, if said second bus user acknowledges receipt of said ONE bit, in the next state, said ZERO data line is carried on said third physical line, said ONE data line is carried on said first physical line, and said acknowledge line is carried on said second physical line.

17. A bus system according to claim 14, further comprising:

d) a third bus user coupled to said ZERO data line and said ONE data line and said acknowledge line, wherein said acknowledge line is normally asserted by said third bus user, said first bus user transmits a ZERO bit to said second and third bus users by asserting said ZERO data line, said second and third bus user acknowledge receipt of said ZERO bit by asserting said ZERO data line and de-asserting said acknowledge line, said first bus user transmits a ONE bit to said second and third bus users by asserting said ONE data line, and said second and third bus users acknowledges receipt of said ONE bit by asserting said ONE data line and de-asserting said acknowledge line.

18. A bus system according to claim 17, wherein: in an initial state, said ZERO data line is carried on a first physical line, said ONE data line is carried on a second physical line, said acknowledge line is carried on a third physical line, if said second and third bus users acknowledge receipt of said ZERO bit, in a next state, said ZERO data line is carried on said second physical line, said ONE data line is carried on said third physical line, and said acknowledge line is carried on said first physical line.

19. A bus system according to claim 18, wherein: after said initial state, after if said second and third bus users acknowledge receipt of said ONE bit, in the next state, said ZERO data line is carried on said third physical line, said ONE data line is carried on said first physical line, and said acknowledge line is carried on said second physical line.

20. A method of transferring data from a first bus user to a second bus user via a serial link, said method comprising:

a) said first bus user transmitting a first bit of data to said second bus user;

b) said first bus user waiting for acknowledgment of said first bit;

c) said second bus user transmitting an acknowledgment of said first bit to said first bus user; and d) after receipt of said acknowledgement from said second bus user, said first bus user transmitting a second bit of data to said second bus user.

21. A method according to claim 20, wherein:

said transmitting of said first bit comprises asserting one of a first signal or a second signal, and said transmitting of said acknowledgement comprises asserting the other of said first signal or said second signal.

22. A method according to claim 21, wherein:

said asserting one of a first signal or a second signal comprises asserting a first line or a second line of the serial link, and said asserting the other of said first signal or said second signal comprises asserting the other of the first line or the second line of the serial link.

23. A method according to claim 21, wherein:

said first bus user continues to assert a first line or a second line of the serial link until said second bus user asserts the other of the first line or the second line of the serial link.

24. A method according to claim 21, wherein:

said first signal is a positive voltage and said second signal is a negative voltage.

* * * * *